(No Model.)
W. T. HOGG.
PLOW.
No. 507,271. Patented Oct. 24, 1893.
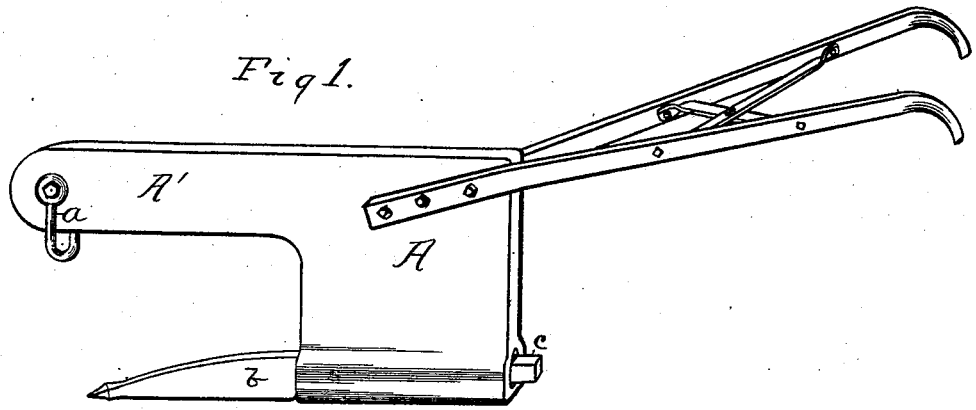
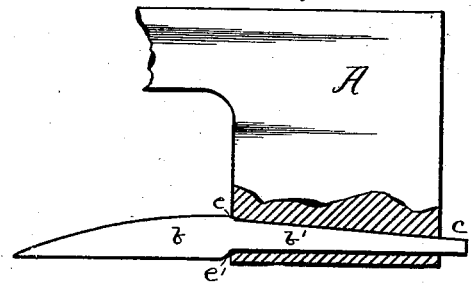 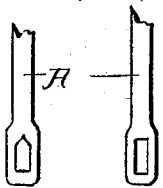
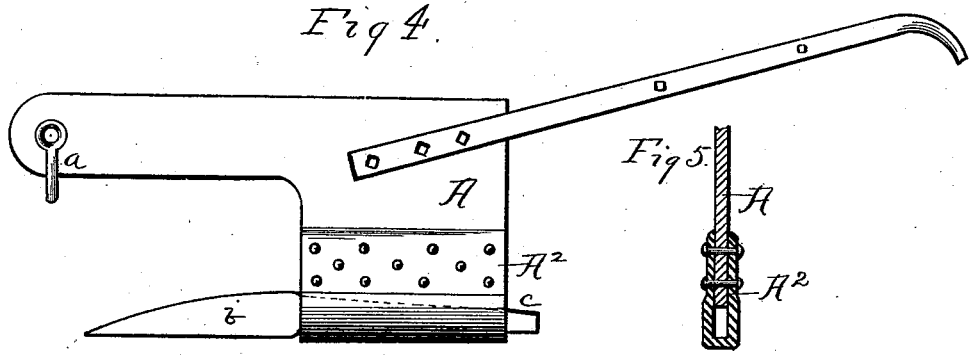 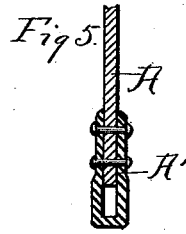
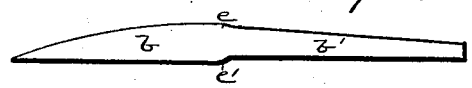
WITNESSES:
L. C. Leoty.
H. L. Dunn.
INVENTOR
William T. Hogg.
BY
R. Jay McCarty,
ATTORNEY.

UNITED STATES PATENT OFFICE.

WILLIAM T. HOGG, OF DAYTON, OHIO, ASSIGNOR OF TWO-THIRDS TO WM. S. BROWN AND HENRY E. JOYCE, OF SAME PLACE.

PLOW.

SPECIFICATION forming part of Letters Patent No. 507,271, dated October 24, 1893.

Application filed August 28, 1893. Serial No. 484,186. (No model.)

*To all whom it may concern:*

Be it known that I, WILLIAM T. HOGG, of Dayton, county of Montgomery, State of Ohio, have invented a new and useful Improvement in Plows; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in plows of the class designed for use in excavating soil for street paving work, which work is well known to be of such a nature as to require a plow of peculiar make and of the strongest possible construction, in order that the parts may withstand the severe strain they are called upon to meet.

The object of my invention is to so construct and attach the blade or tenon that it may be equal to the greatest amount of strain; and further to provide means for readily removing and replacing said blade or tenon should such become necessary.

To these ends my improvements consist of parts that will be described in the specification, and shown in the drawings annexed hereto.

Figure 1, is a side elevation of a plow constructed in accordance with my invention. Fig. 2, is a side elevation partly in section, with parts removed. Fig. 3, represents rear and front views of the land plate, showing the rear and front of the socket or mortise, the upper portion of the plate being broken off; Fig. 4, a side elevation of the plow showing the preferred construction; Fig. 5, a vertical section through the land plate, conforming to the construction shown in Fig. 4, the upper part of said plate being broken away; Fig. 6, a detached detail view of the blade or tenon.

Similar letters of reference indicate corresponding parts in the different views.

A indicates the land plate substantially of the form shown in the various views, with the forward extension A' to which the draft coupling (a) is attached; the handles being attached in any suitable manner as by bolts and nuts, as shown in Figs. 1 and 4. In the lower portion of the land plate a longitudinal slot or mortise is provided with the upper surface of said mortise tapering or inclining rearwardly as appears in Fig. 2. This receives the shank $b'$ of tenon $b$ which shank is rectangular in cross section and of a shape that conforms to the mortise, and projects rearwardly through said mortise as at $(c)$; the tenon $b$ is provided with a slight bulge $e$ on its upper surface, and a shoulder $e'$ on its lower surface whereby its insertion in the mortise is limited to a desirable extent. It will be noted that the longitudinal extent of the mortise approximates one half the length of the blade or tenon; this affords a substantial bearing for said tenon, and enables the parts to successfully meet the enormous strain they are called upon to stand when tearing up concrete or macadamized soil, preparatory to street paving. The pressure against the tenon has the effect of wedging the latter in the mortise and retains it there. Therefore I do not find it necessary to employ any other means for securing said tenon, and this is important, for the reason that should a blade or tenon become broken or inoperative it may be driven out of the socket or mortise by a blow on the rear end $(c)$, from a hammer, and a new tenon quickly and easily inserted, without delay as would be the case were bolts or other similar means employed.

Fig. 1 illustrates the land plate constructed of one piece of steel and welded to form the longitudinal mortise.

In Fig. 4, a separate piece $A^2$ is riveted to the sides of, and incloses the lower edge of plate A. This riveted piece $A^2$ forms the mortise while the lower edge of plate A terminates on a taper or incline, as shown in dotted lines, Fig. 4, and forms the upper surface of the mortise. This manner of construction, I deem the best for the reason that the desirable form of mortise is thus easier obtainable, and the work of construction more readily performed.

The advantages of my plow have been mentioned in the foregoing specification. Briefly speaking, they lie in the great durability and strength that are obtained in the peculiar construction of the tenon which is made of a good quality of steel, the mortise, the substantia manner of the tenons attachment unaided by bolts or screws, and the ready facility with which its removal is effected when broken.

Having described my invention, I claim—

1. The plate A with its lower horizontal edge terminating in a rearward incline, the part $A^2$ riveted to said plate A, and forming a longitudinal mortise therewith, the blade or tenon adapted to fit said mortise and project beyond the front and rear terminals thereof, as herein described.

2. The combination of the plate A with the longitudinal mortise in its lower horizontal portion, the blade or tenon $b$ with shoulder $e'$, bulge $e$ and tapering shank $b'$, substantially as herein described.

In testimony whereof I have hereunto set my hand this 25th day of August, 1893.

WILLIAM T. HOGG.

Witnesses:
WM. S. BROWN,
H. E. JOYCE.